(12) United States Patent
Yamaguchi

(10) Patent No.: US 10,139,548 B2
(45) Date of Patent: Nov. 27, 2018

(54) OPTICAL APPARATUS AND IMAGE PICKUP APPARATUS

(71) Applicant: CANON KABUSHIKI KAISHA, Tokyo (JP)

(72) Inventor: Yutaka Yamaguchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/636,750

(22) Filed: Jun. 29, 2017

(65) Prior Publication Data

US 2018/0011239 A1   Jan. 11, 2018

(30) Foreign Application Priority Data

Jul. 11, 2016  (JP) ................. 2016-137000

(51) Int. Cl.

| G02F 1/13363 | (2006.01) |
|---|---|
| G02B 5/30 | (2006.01) |
| G02F 1/1335 | (2006.01) |
| G02B 27/28 | (2006.01) |
| G03G 15/04 | (2006.01) |

(Continued)

(52) U.S. Cl.
CPC ......... *G02B 6/0055* (2013.01); *G02B 5/3083* (2013.01); *G02B 27/28* (2013.01); *G02F 1/13362* (2013.01); *G02F 1/13363* (2013.01); *G03G 15/04* (2013.01); *G03G 15/056* (2013.01); *G02B 6/0011* (2013.01); *G02F 1/133528* (2013.01); *H04N 9/3167* (2013.01)

(58) Field of Classification Search
CPC ............. G02F 1/13363; G02F 2202/40; G02F 2001/133638; G02F 1/1393; G02F 1/133528; G02F 1/13362; G02B 5/3083; G02B 5/3033; G02B 5/3025; G02B 27/26; G02B 27/28; Y10T 428/1041; G03G 15/056; G03G 15/04; H04N 9/3167

See application file for complete search history.

(56) References Cited

U.S. PATENT DOCUMENTS

| 6,204,904 B1 * | 3/2001 | Tillin .............. G02F 1/13363 349/113 |
|---|---|---|
| 2003/0002131 A1 * | 1/2003 | Zou ................ G02F 1/0136 359/291 |

(Continued)

FOREIGN PATENT DOCUMENTS

| JP | H0764048 A | 3/1995 |
|---|---|---|
| JP | 2010124011 A | 6/2010 |

(Continued)

*Primary Examiner* — Jia Pan
(74) *Attorney, Agent, or Firm* — Rossi, Kimms & McDowell LLP

(57) ABSTRACT

An optical apparatus is configured to introduce light from an object to an image pickup element, and includes first, second, and third retardation plates, a polarizer, and a setter. The first retardation plate, the second retardation plate, and the polarizer are arranged in this order from a side of the object to a side of the image pickup element. The slow axis direction or the fast axis direction of the second retardation plate tilts to the slow axis direction or the fast axis direction of the first retardation plate. The setter sets the retardation of the second retardation plate according to the polarization component of the light from the object.

20 Claims, 8 Drawing Sheets

(51) Int. Cl.
*G03G 15/056* (2006.01)
*H04N 9/31* (2006.01)
*F21V 8/00* (2006.01)

(56) References Cited

U.S. PATENT DOCUMENTS

2009/0079982 A1* 3/2009 Lefaudeux ................ G01J 4/04
356/364
2016/0103062 A1* 4/2016 Shribak .............. G02B 21/0092
356/365

FOREIGN PATENT DOCUMENTS

| JP | 2010277016 A | 12/2010 |
|----|--------------|---------|
| JP | 5045504 B2 | 10/2012 |

* cited by examiner

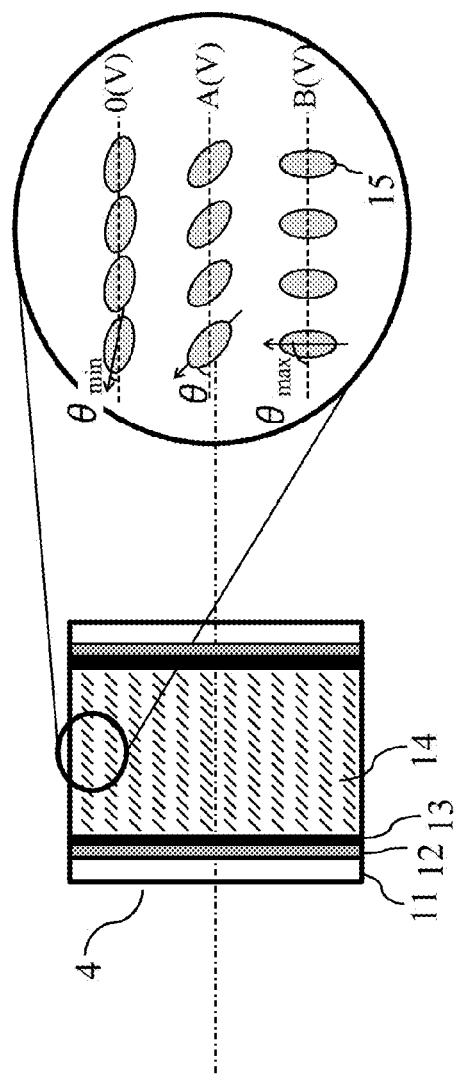
FIG. 2
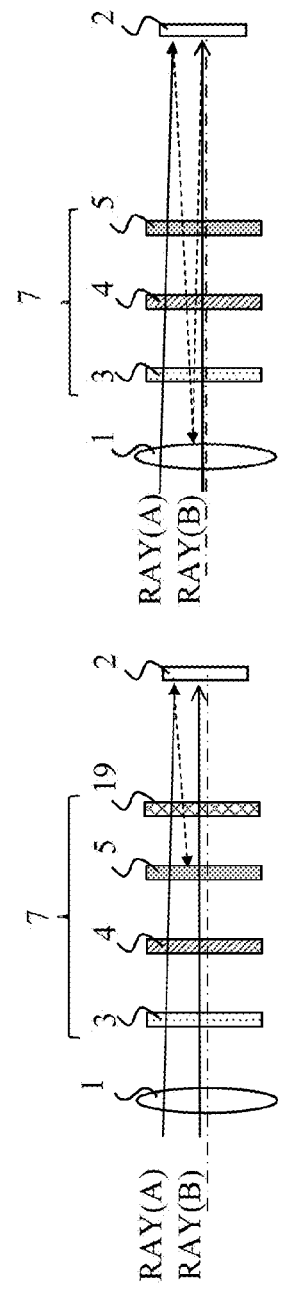
FIG. 3A
FIG. 3B

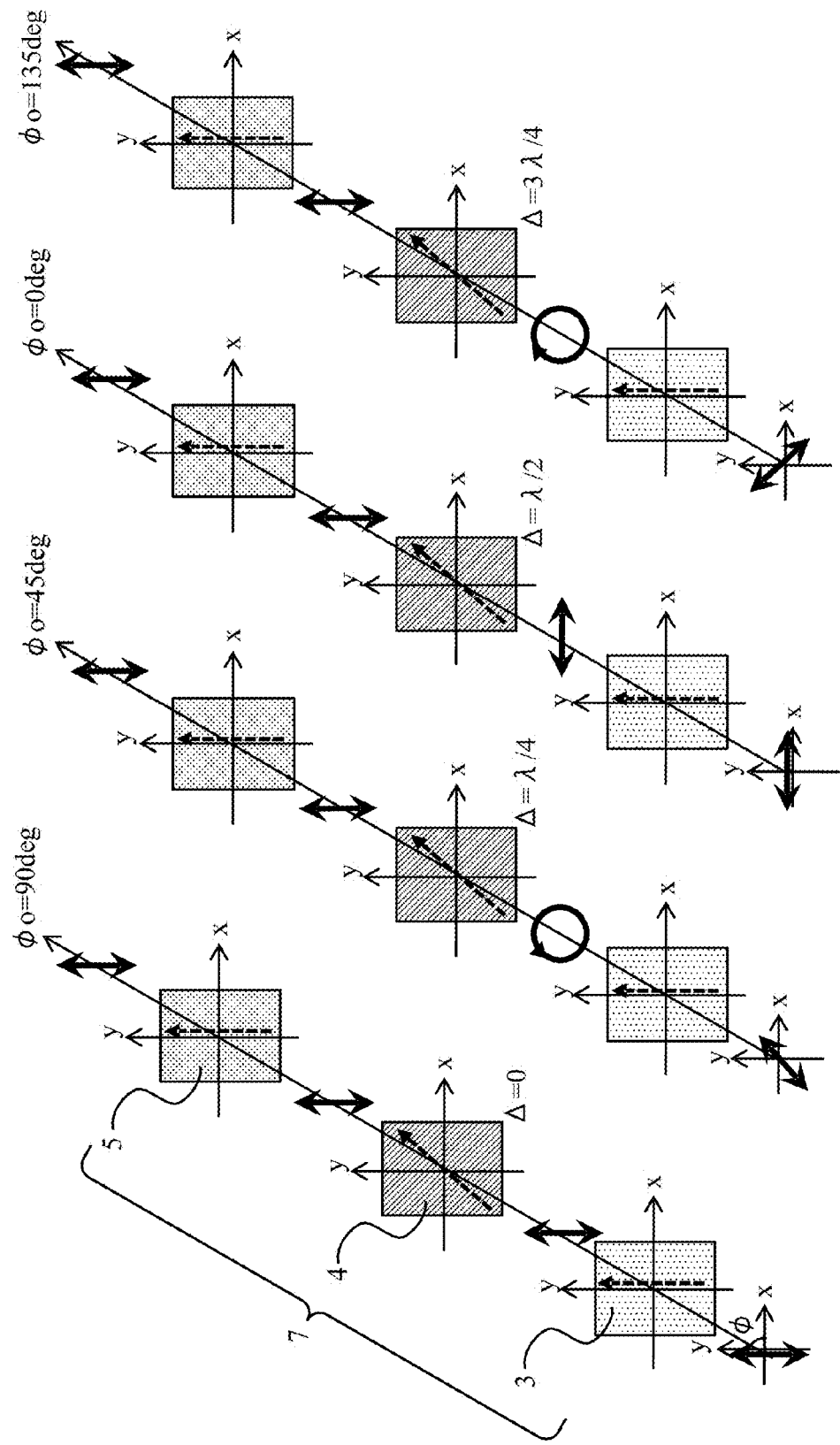

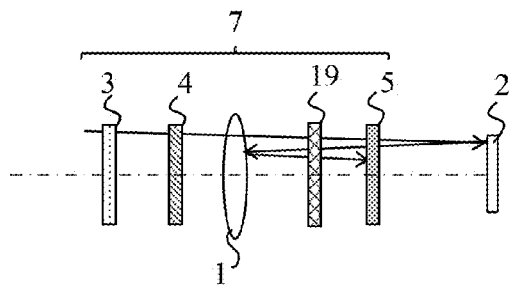
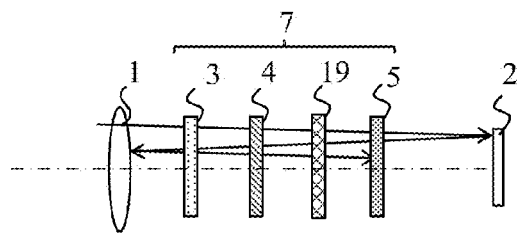
FIG. 9A  FIG. 9B
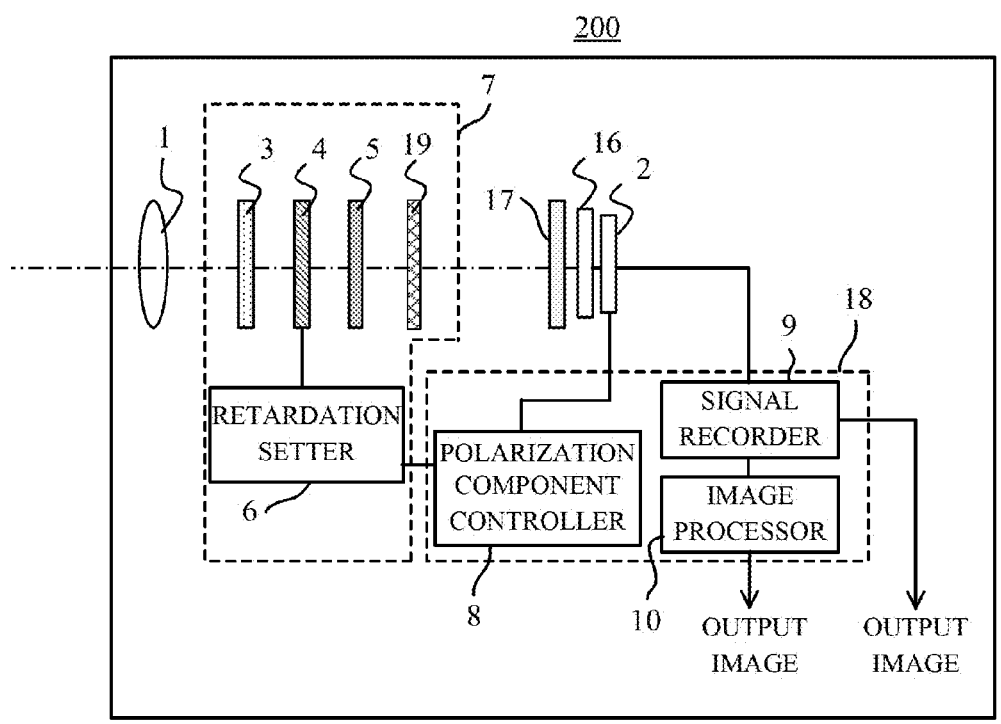
FIG. 10

OPTICAL APPARATUS AND IMAGE PICKUP APPARATUS

BACKGROUND OF THE INVENTION

Field of the Invention

The present invention relates generally to an optical apparatus and an image pickup apparatus, and more particularly to an optical apparatus and an image pickup apparatus having the same, each of which can obtain polarization information.

Description of the Related Art

One conventional image pickup apparatus can highlight and detect a predetermined feature of an object by observing a polarization state of light from the object. For example, a polarization filter attached to a front surface of a lens in a single-lens reflex camera in imaging an object can highlight the quality or feel of the object, such as a color and a contrast, or highlight or reduce the glare of reflected light on a water surface, etc. An inspection apparatus etc. is also known which can detect an edge or defect of the object.

Stray light, such as ghost and flare, may appear in a captured image due to an illumination state of an object, an image pickup condition of an optical system, etc. The stray light not only deteriorates the quality of the image but also is recorded as information (an error) different from the object information when the polarization information of the object is obtained. In particular, due to the multiple reflections on an image display device surface in an image display device and on the optical plane in an optical system in an image pickup system, the polarization depends on an incident angle and thus it is difficult to distinguish the polarization information of the object from the polarization information of the stray light. As a solution for this problem, Japanese Patent No. 5,045,504 discloses a method for utilizing a difference of a polarization reflectance in an antireflection film in the optical system to reduce the stray light through a polarizer.

However, the method disclosed in Japanese Patent No. 5,045,504 cannot distinguish the object and the stray light from each other where a polarizer is used to obtain the polarization information. Moreover, this method cannot effectively reduce concurrent stray light fluxes at different angles of view in the image, and stray light with a small incident angle on an optical plane in an image pickup lens system, such as stray light reflected between an image pickup element and an optical system.

SUMMARY OF THE INVENTION

The present invention provides an optical apparatus and an image pickup apparatus, each of which can restrain influence of stray light, such as ghost and flare, from affecting polarization information of an object with a simple configuration.

An optical apparatus according to one aspect of the present invention is configured to introduce light from an object to an image pickup element. The optical apparatus includes a first retardation plate configured to provide a retardation of π/2 between a polarization component in a slow axis direction and a polarization component in a fast axis direction, a second retardation plate configured to change a retardation to be provided between a polarization component in a slow axis direction and a polarization component in a fast axis direction, a third retardation plate configured to provide a retardation of π/2 between a polarization component in a slow axis direction and a polarization component in a fast axis direction, a polarizer configured to extract a polarization component to be introduced to the image pickup element, and a setter configured to set the retardation of the second retardation plate. The first retardation plate, the second retardation plate, and the polarizer are arranged in this order from a side of the object to a side of the image pickup element. The slow axis direction or the fast axis direction of the second retardation plate tilts to the slow axis direction or the fast axis direction of the first retardation plate. The setter sets the retardation of the second retardation plate according to the polarization component of the light from the object.

Further features of the present invention will become apparent from the following description of exemplary embodiments with reference to the attached drawings.

BRIEF DESCRIPTION OF THE DRAWINGS

FIG. 2 is a configuration diagram of the variable retardation plate.

FIGS. 3A and 3B illustrate a configuration of restraining stray light according to the first embodiment.

FIGS. 7A to 7D illustrate state changes of a polarization component at a maximum transmission angle corresponding to the retardation of the variable retardation plate.

FIGS. 9A and 9B illustrate a configuration of restraining stray light according to a second embodiment.

FIG. 10 illustrates a configuration of an image pickup apparatus according to a third embodiment.

DESCRIPTION OF THE EMBODIMENTS

Figure 1A:
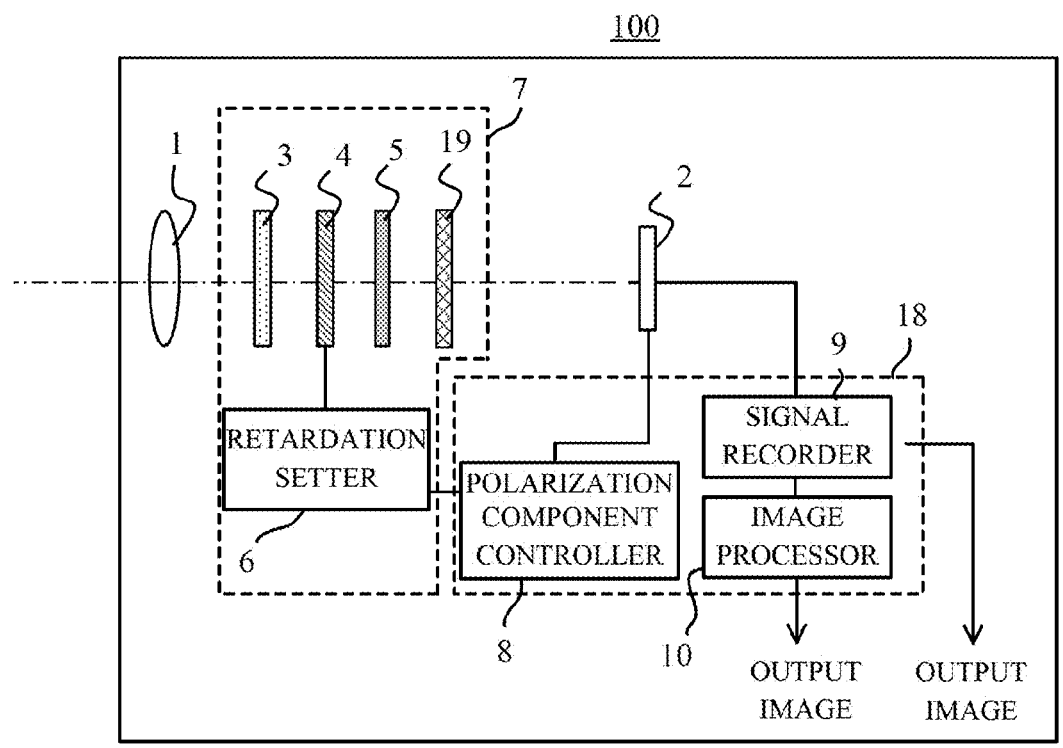
FIGS. 1A to 1C illustrate a configuration of an image pickup apparatus according to a first embodiment of the present invention.

A detailed description will now be given of embodiments of the present invention with reference to the accompanying drawings. Those elements in each figure, which are corresponding elements, will be designated by the same reference numerals, and a description thereof will be omitted.

First Embodiment

Figures 1B, 1C:
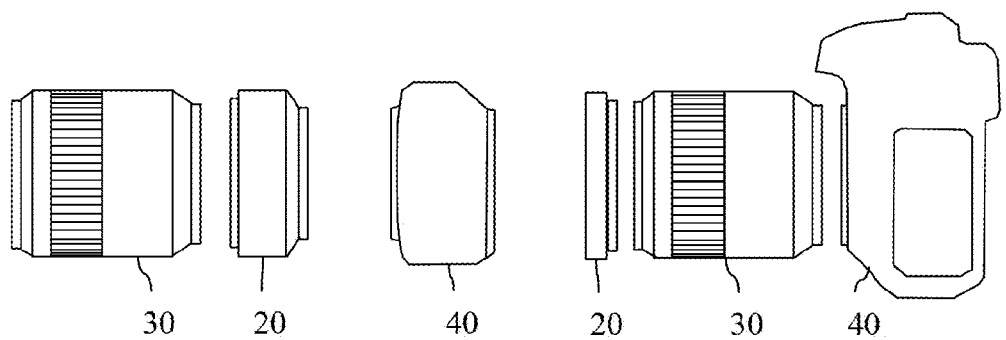

Referring to FIGS. 1A to 1C, a description will be given of a configuration of an image pickup apparatus 100 according to this embodiment. FIG. 1A is a schematic view that simply illustrates the configuration of the image pickup apparatus 100 according to this embodiment. The image pickup apparatus 100 includes an optical system 1 configured to image light from an object on an image pickup element 2, the image pickup element 2 configured to obtain image information of the object, a polarization obtainer 7 disposed on an optical path between the optical system 1 and the image pickup element 2, and a control apparatus (controller) 18 as a microcomputer, etc. This embodiment disposes the polarization controller 7 on the optical path between the optical system 1 and the image pickup element 2, but the present invention is not limited to this embodiment. The polarization obtainer 7 may be disposed on a light incident side (object side) of the image pickup element 2, but may be disposed on the light incident side of the optical system 1 or among the plurality of optical elements where the optical system 1 includes a plurality of optical elements.

The polarization obtainer 7 is provided in the image pickup apparatus 100 in this embodiment, may be configured as an adapter 20 (an optical apparatus) separate from the image capturing apparatus 100, as illustrated in FIGS. 1B and 1C. The adapter 20 can be attached to the lens or digital camera having a common mount, and used in combination with a lens 30 and a digital camera 40 at a position illustrated in FIGS. 1B and 1C in obtaining polarization information. As described later, in an attempt to reduce light reflected from the image pickup element 2, the adapter 20 may be disposed between the lens 30 and the digital camera 40, as illustrated in FIG. 1B.

The polarization obtainer 7 includes a quarter waveplate (first retardation plate) 3, a variable retardation plate (second retardation plate) 4, a polarizer 5, a quarter waveplate (third retardation plate) 19, and a retardation setter 6. The quarter waveplate 3, the variable retardation plate 4, the retardation plate 5, and the quarter waveplate 19 are arranged so that each axis is located on a plane perpendicular to the optical axis in the optical system 1. The quarter waveplate 3, the variable retardation plate 4, the polarizer 5, and the quarter waveplate 19 are adjacently arranged in this embodiment.

The quarter waveplate 3 includes an extension film, and provides a (relative) retardation (phase difference) of $\pi/2$ (rad) between polarization components orthogonal to the incident light. The retardation of n/2 provided by the quarter waveplate 3 is unchangeable or fixed. This embodiment uses the quarter plate, but a third-quarter plate or a variable retardation plate may be used as long as it can provide a retardation of n/2.

The variable retardation plate 4 provides a (relative) retardation similar to that of the quarter waveplate 3 (referred to as a "retardation of the variable retardation plate 4" hereinafter) between the polarization components orthogonal to the incident light which is variable according to the applied voltage. The variable retardation plate 4 in this embodiment is a liquid crystal device, and changes the retardation of the variable retardation plate 4 according to the applied voltage. FIG. 2 is a configuration diagram of the variable retardation plate 4, and a circle in FIG. 2 enlarges the liquid crystal layer. The variable retardation plate 4 includes substrates 11, electrode layers 12, alignment films 13, and a liquid crystal layer 14 held by the substrates 11, the electrode layers 12, and the alignment films 13. The liquid crystal layer 14 is a VA type liquid crystal layer (VA liquid crystal layer), and liquid crystal molecules 15 follow the alignment film 13. When the applied voltage is changed in order of 0 [V], A [V], and B (>A) [V], a tilt angle of the liquid crystal molecule 15 changes from a minimum value $\theta_{min}$ (degree) to a maximum value $\theta_{max}$ (degree) through an intermediate value $\theta$ (degree). The retardation setter 6 applies the voltage to the variable retardation plate 4, controls the tilt angle $\theta$ of the liquid crystal molecule 15 or the refractive index anisotropy, and changes the retardation of the variable retardation plate 4. The configuration of the variable retardation plate 4 illustrated in FIG. 2 is merely illustrative, and the present invention is not limited to this configuration. For example, instead of the tilt angle, a liquid crystal device having a different driving method for varying an alignment direction may be used. In addition, a method for utilizing a refractive index change by an electro-optic effect, a method for precisely controlling a grating height and interval in the birefringence using a fine structure, or a combination thereof may be used. The variable retardation plate 4 may uniformly vary the retardation on a plate surface, or provide a different retardation in a different area on the plate surface.

The polarizer 5 transmits (extracts) a component of the transmitting axis direction (transmitting polarization azimuth) among the polarization components of the incident light. Since the polarization obtainer 7 is used for the image pickup apparatus 100, the polarizer 5 may use a type of absorbing unnecessary light. When the polarizer 5 uses a type of reflecting the unnecessary light, such as a wire grid polarizer, it reflects the polarized light to be cut and the reflected light becomes stray light and ghost, negatively affecting the image. Hence, this type is not suitable for the configuration of the image pickup apparatus 100. In order to reduce the influence of the ghost, the polarizer 5 may characteristically absorb 50% or more of the polarized light that oscillates in the direction orthogonal to the transmission axis. This polarizer may include, for example, a film made by extending a resin material containing an iodic compound, but the present invention is not limited to this example and may use an arbitrary absorption type polarizer.

The retardation setter 6 sets (changes) the retardation of the variable retardation plate 4 according to the signal (command) from the image pickup apparatus 100. This embodiment provides the retardation setter 6 in the polarization obtainer 7, but may provide it into the image pickup apparatus 100 separate from the polarization obtainer 7.

The quarter waveplate 19 provides a (relative) retardation (phase difference) of $\pi/2$ (rad) between polarization components orthogonal to linearly polarized light emitted from the polarizer 5 or reflected light emitted from the image pickup element 2. The quarter waveplate 19 is disposed so that its slow axis direction or fast axis direction tils to the transmission axis direction of the polarizer 5 by 45 degrees. However, the angle may not be strictly 45 degrees and may be substantially (approximately) 45 degrees so as to permit a slight angular shift by several degrees. This embodiment uses the quarter waveplate, but a third-quarter waveplate or a variable retardation plate may be used as long as it can provide a retardation of n/2, similar to the quarter waveplate 3.

A working wavelength range is a wavelength range in which the image pickup apparatus 100 works, and can be selected based on the wavelength characteristic of the image pickup element 2 and application. This embodiment sets the working wavelength range to a visible range (400 nm to 700 nm). The working wavelength range may be at least one of the visible range (400 nm to 700 nm), the near-infrared range (700 nm to 1100 nm), and the near-ultraviolet range (200 nm to 400 nm) based on the configuration of the image pickup apparatus 100. A designed wavelength $\lambda$ (nm) for the variable retardation plate 4 may be selected according to the working wavelength range obtained by the image pickup apparatus 100 so as to maintain the proper characteristic.

The control unit (control apparatus) 18 includes a polarization component controller 8, a signal recorder 9, an image processor 10, and controls the image pickup by the image pickup apparatus 100. The image pickup apparatus captures an image by timewise changing the retardation of the variable retardation plate 4 while maintaining the transmitting axis direction of the polarizer 5. The control unit 18 obtains polarization information of the object based on a plurality of obtained images. The polarization component controller 8 outputs a control signal for the retardation of the variable retardation plate 4 to the retardation setter 6 in synchronization with the image pickup element 2. This control changes the polarization component of light from the object which the image pickup element 2 receives, and can provide an image having the polarization information of the object. The signal recorder 9 temporarily stores an image acquired from the image pickup element 2 etc. in an unillustrated recording medium, such as a RAM. The stored images may be output as a plurality of images directly or as one or more images after the image processor 10 performs a predetermined process. The plurality of directly output images may be later processed by an external processing apparatus, such as a PC, as an image which needs a more complicated calculation. Where the signal processor 10 extracts a predetermined feature amount, a predetermined image can be quickly obtained.

FIGS. 3A and 3B schematically illustrate an arrangement of the optical system 1, the polarization obtainer 7, and the image pickup element 2. FIG. 3A schematically illustrates the quarter waveplate 19 disposed between the polarizer 5 and the image pickup element 2 according to this embodiment. FIG. 3B schematically illustrates a comparative example in which the quarter waveplate 19 is not included in the polarization obtainer 7. A ray (A) is stray light, and a ray (B) is image light from an object.

In FIG. 3B, the ray (A) transmits through the optical system 1, the quarter waveplate 3, and the variable retardation plate 4, becomes linearly polarized light by the polarizer 5, and reaches the image pickup element 2. Part of the ray that has reached the image pickup element 2 is reflected on the image pickup element 2, again passes the polarizer 5, the variable retardation plate 4, and the quarter waveplate 3, and reaches the optical system 1. Part of the light that has reached the optical system 1 is reflected on the optical system 1, again reaches the image pickup element 2, and appears as stray light in the image. The ray (A) is reflected on the image pickup element 2, then transmits through the polarizer 5, becomes linearly polarized light once, and transmits through the quarter waveplate 3 and the variable retardation plate 4 a plurality of times. Therefore, the ray (A) that has reached the image pickup element 2 has a high polarization degree. When the ray (A) and the ray (B) as the image light from the object reach the same pixel on the image pickup element 2, the control unit 18 simultaneously obtains the polarization information of the object (information of the ray (B)) and the polarization information of the stray light (information of the ray (A)). Since the control unit 18 cannot distinguish the ray (A) and the ray (B) from each other based on the image, erroneous information is superimposed on the polarization information of the object.

On the other hand, in FIG. 3A, the polarizer cuts the light reflected from the image pickup element 2 since the quarter waveplate 19 makes the polarization direction of the light reflected on the image pickup element 2 and the absorption axis direction of the polarizer 5 parallel to each other. Therefore, the quarter waveplate 19 prevents the light reflected on the image pickup element 2 from being again reflected on the optical system 1 and from reaching the image pickup element 2 without affecting the acquisition of the polarization information, which will be described later, and thereby the control unit 18 can correctly obtain only the information of the ray (B). The polarization information of the object can be precisely expressed in a variety of image processes with the polarization information.

The polarization obtainer 7 may include a rotation mechanism for integrally rotating optical elements, for example, from the quarter waveplate 3 to the polarizer 5 around the optical axis. In general, the polarization state of the stray light multi-reflected in the optical system 1 is partially biased, and thus the multi-reflected stray light generated in the optical system 1 can be reduced by adjusting the rotating angle with the rotation mechanism. More specifically, the polarization obtainer 7 may be rotated around the optical axis while the stray light is confirmed for a proper azimuth. The integral rotation of the optical elements can maintain the function of the polarization obtainer 7 and cut the stray light from the image pickup element 2.

A description will now be given of a method for obtaining a plurality of images in different polarization states by capturing an image while the transmitting axis direction of the polarizer 5 is fixed and the retardation of the variable retardation plate 4 is changed. The light that has transmitted through the polarizer 5 transmits through the quarter waveplate 19 but the quarter waveplate 19 does not directly involve obtaining the polarization information and thus a description thereof will be omitted.

Figure 4A:
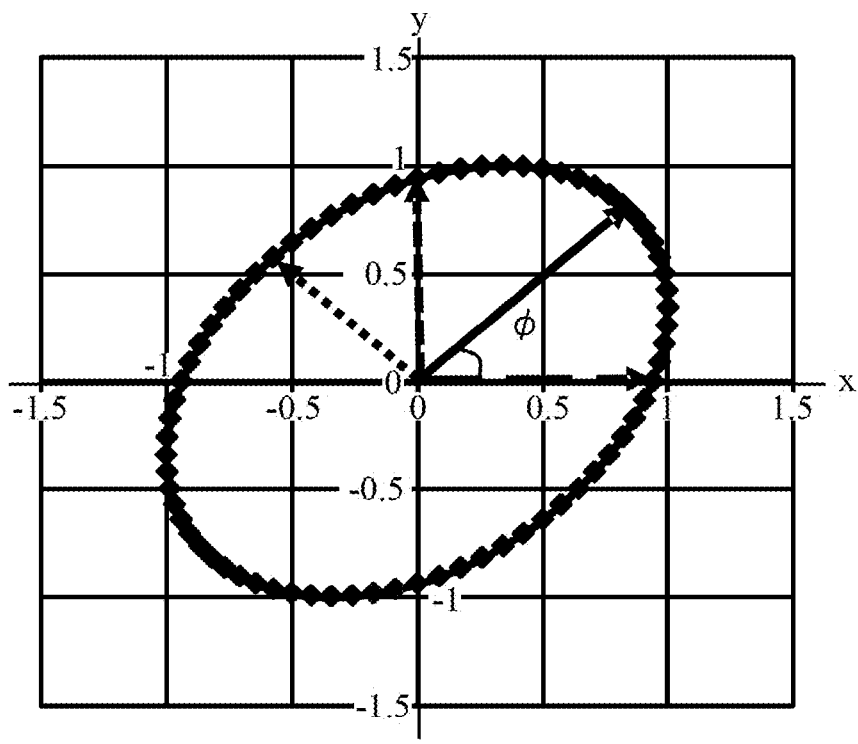
FIGS. 4A and 4B illustrate an azimuth dependency of a light intensity and a polarization state of incident light.
Figure 4B:
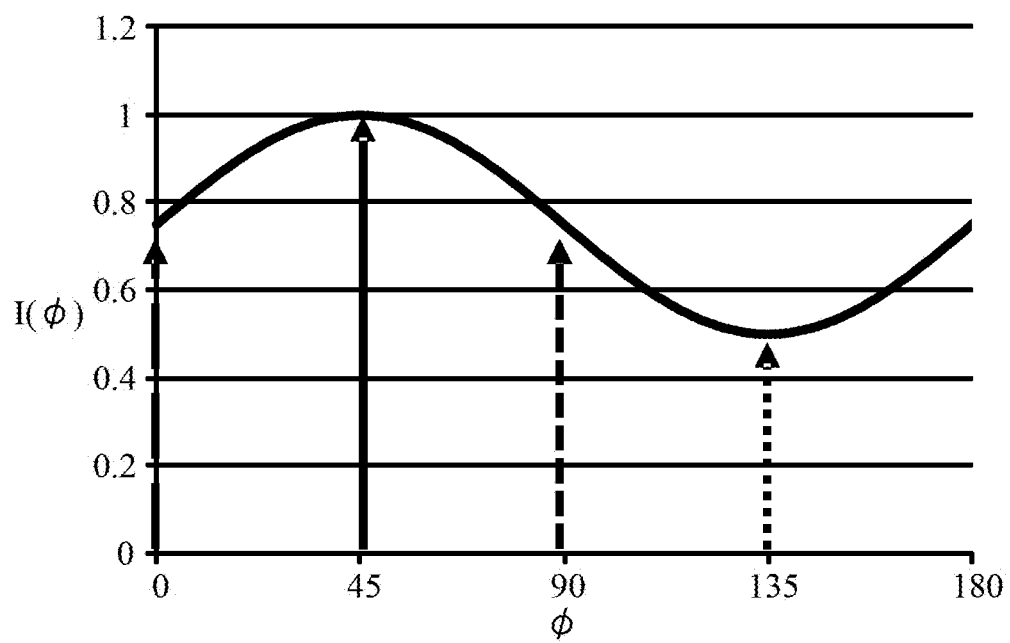

Referring now to FIGS. 4A and 4B, a description will be given of an azimuth dependency of a light intensity from a general object. An ellipse illustrated in FIG. 4A indicates an azimuth dependency on an amplitude of an illustrative polarization state, where φ is an azimuth angle (degree) to an x-axis direction of the polarization direction. FIG. 4B is a view where an abscissa axis denotes the azimuth angle φ and an ordinate axis denotes a light intensity I(φ) as a square of an elliptical radius in FIG. 4A for the azimuth angle φ. Arrows with different line types in FIG. 4A correspond to arrows of the same line type of arrows in FIG. 4B. The polarization component at the azimuth angle φ of 45 degrees has the highest light intensity in FIGS. 4A and 4B. Therefore, an image in which a characteristic of the object is most highlighted can be obtained by extracting two orthogonal polarization components at the azimuth angles φ of 45 degrees and 135 degrees.

Referring now to FIGS. 5A to 5D, a description will be given of a behavior of incident light on the polarization obtainer 7 where a transmitting axis direction of the polarizer 5 is fixed and the retardation of the variable retardation plate 4 is set constant. FIGS. 5A to 5D illustrate transmittance dependencies of the polarization obtainer 7 on the polarization azimuth of the incident light. In FIGS. 5A to 5D, the retardation of the variable retardation plate 4 is set to λ/4. An arrow direction and length before and after the transmission through the polarization obtainer 7 represent the polarization azimuth and intensity. Each broken-line arrow on the quarter waveplate 3 and the variable retardation plate 4 represents a slow axis direction, and a broken-line arrow on the polarizer 5 represents a transmitting axis direction.

The quarter waveplate 3 and the polarizer 5 are arranged so that the slow axis direction of the quarter waveplate 3 is parallel to the transmitting axis direction of the polarizer 5. However, they may not be strictly parallel to each other and may be substantially (approximately) parallel to each other so as to permit a slight angular shift by several degrees. The variable retardation plate 4 is disposed so that its slow axis direction inclines to the slow axis direction of the quarter waveplate 3 and the transmitting axis direction of the polarizer 5 by 45 degrees. However, it may not be strictly 45 degrees and considered to be substantially 45 degrees (almost 45 degrees) so as to permit a slight angular shift by several degrees.

In this embodiment, each of the slow axis direction of the quarter wavelength 3 and the transmitting axis direction of the polarizer 5 relative to the x-axis direction forms an azimuth angle φ of 90 degrees. However, it may not be strictly 90 degrees and considered substantially or almost 90 degrees so as to permit a slight angular shift by several degrees. The azimuth angle φ of the slow axis direction of the variable retardation plate 4 relative to the x-axis is 45 degrees. However, it may not be strictly 45 degrees and considered to be substantially 45 degrees (almost 45 degrees) so as to permit a slight angular shift by several degrees.

The quarter waveplate 3 and the polarizer 5 may be arranged so that each of the slow axis direction of the quarter waveplate 3 and the transmitting axis direction of the polarizer 5 are parallel to the y-axis direction. In this case, the azimuth angle φ of the fast axis direction of the variable retardation plate 4 relative to the x-axis direction is 45 degrees.

Figures 5A, 5B, 5C, 5D:
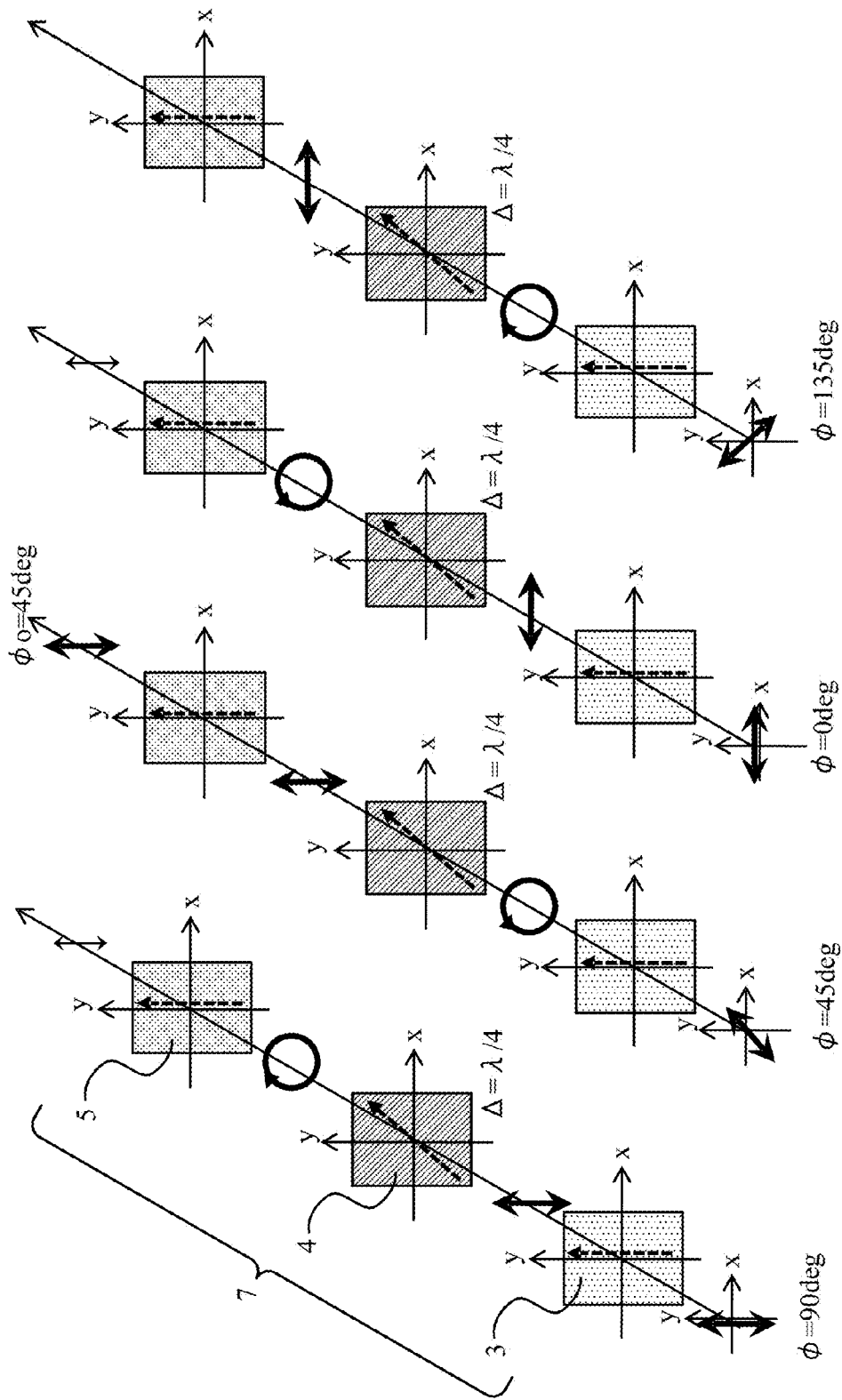
FIGS. 5A to 5D illustrate transmittance dependencies of a polarization obtainer on a polarization direction of incident light.

FIG. 5A illustrates an incident polarization component with an azimuth angle φ of 90°. The incident light transmits through the quarter waveplate 3 without being affected by the phase change, since the polarization azimuth is parallel to the slow axis direction of the quarter waveplate 3. The light that has transmitted through the quarter waveplate 3 is converted into rightward circularly polarized light by the variable retardation plate 4, and becomes linearly polarized light having an intensity of about 50% of the incident light after transmitting through the polarizer 5.

FIG. 5B illustrates an incident polarization component with an azimuth angle φ of 45 degrees. The incident light is converted into leftward circularly polarized light by the quarter waveplate 3. The light that has transmitted through the quarter waveplate 3 is converted into linearly polarized light having an azimuth angle φ of 90 degrees in the polarization azimuth by the variable retardation plate 4 and parallel to the transmitting axis direction of the polarizer 5. Thus, the resultant light transmits through the polarizer 5 with few losses.

FIG. 5C illustrates an incident polarization component with an azimuth angle φ of 0 degrees. The incident light transmits through the quarter waveplate 3 without being affected by the phase change, since the polarization azimuth is orthogonal to the slow axis direction of the quarter waveplate 3. The light that has transmitted through the quarter waveplate 3 is converted into leftward circularly polarized light by the variable retardation plate 4, and becomes linearly polarized light having an intensity of about 50% of the incident light after transmitting through the polarizer 5.

FIG. 5D illustrates an incident polarization component with an azimuth angle φ of 135 degrees. The incident light is converted into rightward circularly polarized light by the quarter waveplate 3. The light that has transmitted the quarter waveplate 3 is converted into linearly polarized light having an azimuth angle φ of 0 degrees in the polarization azimuth by the variable retardation plate 4 and orthogonal to the transmitting axis direction of the polarizer 5. Thus, the resultant light rarely transmits through the polarizer 5.

When the retardation of the variable retardation plate 4 is λ/4, a transmittance of the polarization component with an azimuth angle φ of 45 degrees becomes maximum in the polarization components of the incident light on the polarization obtainer 7. Hereinafter, $\varphi_o$ (degree) is an angle (maximum transmission angle) of the polarization component from the x-axis direction, which provides the maximum transmittance in the polarization components of the incident light on the polarization obtainer 7.

The image pickup apparatus 100 in this embodiment changes the retardation of the variable retardation plate 4 through an electric control, and changes the maximum transmission angle $\varphi_o$ that is a component at which the transmittance becomes maximum in the polarization components of the incident light. This configuration can provide the polarization information for the plurality of polarization components while fixing the transmission axis of the polarizer 5.

Figure 6:
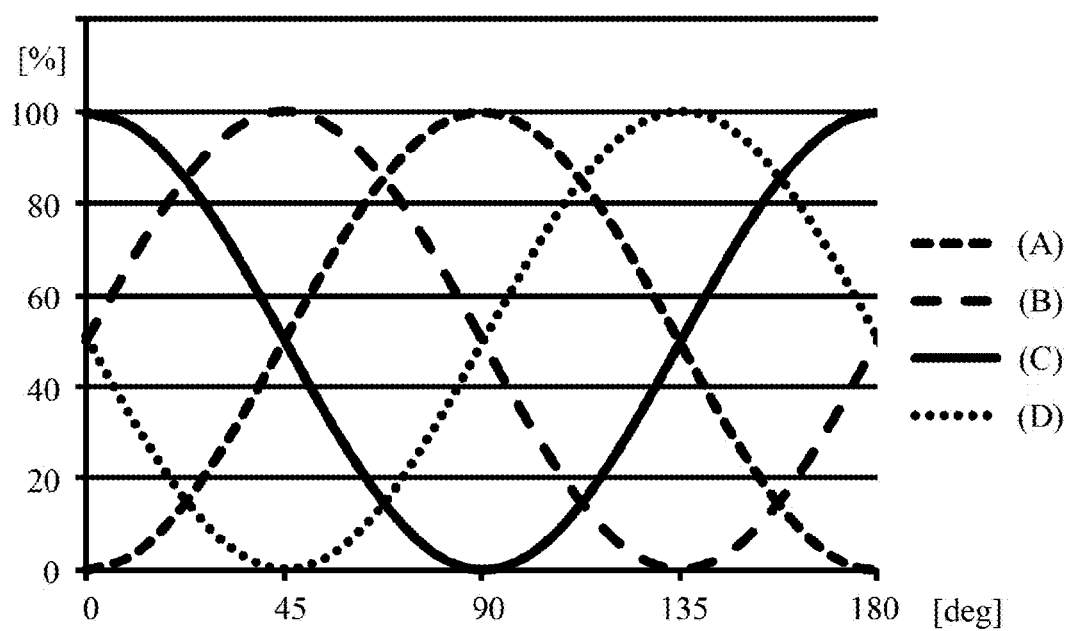
FIG. 6 illustrates a transmittance dependency of a polarization obtainer on a polarization component of incident light for each retardation of the variable retardation plate.

FIG. 6 illustrates a relationship between the azimuth angle φ of the polarization component of the incident light and the transmittance T(φ) of the polarization obtainer 7 for each retardation of the variable retardation plate 4. Lines (A) to (D) in FIG. 6 represent retardations of 0, λ/4, λ/2, and 3λ/4 set to the variable retardation plate 4. For example, in the line (A), the transmittance T(φ) is 100% when the azimuth angle φ is 90 degrees, and the maximum transmission angle $\varphi_o$ is 90 degrees.

FIGS. 7A to 7D illustrate change states of the polarization component of the maximum transmission angle $\varphi_o$ corresponding to the retardation of the variable retardation plate 4. Broken-line arrows on the quarter waveplate 3 and the variable retardation plate 4 represent a slow axis direction, and a broken-line arrow on the polarizer 5 represents a transmitting axis direction. In FIG. 7A, the retardation of the variable retardation plate 4 is set to 0 and the maximum transmission angle $\varphi_o$ is 90 degrees. In FIG. 7B, the retardation of the variable retardation plate 4 is set to λ/4 and the maximum transmission angle $\varphi_o$ is 45 degrees. In FIG. 7C, the retardation of the variable retardation plate 4 is set to λ/2 and the maximum transmission angle $\varphi_o$ is 0 degrees. In FIG. 7D, the retardation of the variable retardation plate 4 is set to 3λ/4 and the maximum transmission angle $\varphi_o$ is 135 degrees.

In other words, in each of FIGS. 7A to 7D, the incident light when transmitting through the quarter waveplate 3 and the variable retardation plate and the desired polarization component of the incident light becomes linearly polarized light parallel to the transmitting axis direction of the polarizer 5 and passes the polarizer 5 with few losses. The polarization obtainer 7 rotates the direction of the desired polarization component in the polarization components of the incident light to the transmitting axis direction of the polarizer 5 and introduces the desired polarization component to the image pickup element 2 with few losses.

Since the slow axis direction of the quarter waveplate 3 and the slow axis direction of the variable retardation plate 4 form 45 degrees and the slow axis direction of the variable retardation plate 4 and the transmission axis of the polarizer 5 form 45 degrees, the influence of the phase (or retardation) information in the incident light becomes minimum. For example, the quarter waveplate 3 converts perfectly circularly polarized incident light into linearly polarized light with an azimuth angle of 45 degrees, which is parallel to the slow axis of the variable retardation plate 4. Thus, the polarization obtainer 7 has a constant transmittance irrespective of the retardation of the variable retardation 4. For elliptically polarized light, its intensity information can be obtained, since a value that depends on an azimuth dependency of the intensity of incident polarized light can be obtained.

In order to calculate the polarization component that maximizes the light intensity in the incident light, the control unit 18 analyzes an azimuth dependency of the light intensity in the incident light by using a proper function, such as a sine function, and an input value from the image pickup element 2 set to the intensity of the polarization component. A transmission light intensity $T_j$ in all polarization components in the incident light with a retardation Δj satisfies the following determinant (1), where $I(\varphi_i)$ is a light intensity of a polarization component at an azimuth angle φi (degrees), and $T_{ij}$ is a transmittance of the polarization obtainer 7 with a retardation $\Delta j$ (nm) of the variable retardation plate 4 relative to the light intensity $I(\varphi_i)$.

$$[T_j] = [T_{ij}] * [I(\varphi_i)] \quad (1)$$

A subscript j in the transmission light intensity $T_j$ corresponds to the retardation $\Delta j$, and each retardation corresponds to a polarization component in one direction in the incident light. $T_{ij}$ is uniquely calculated once the vibration direction of the incident linearly polarized light and the configuration of the polarization obtainer 7 are determined. The control unit 18 can calculate the azimuth dependency of the light intensity in the incident light by previously obtaining the transmittance $T_{ij}$ and by analyzing transmission light intensity $T_j$ as transmission light intensity plots in the vibration direction of the polarization component in the incident light.

The image pickup apparatus 100 can obtain information of the azimuth dependency of the light intensity by electrically driving the variable retardation plate 4 by utilizing the above method without rotating the element.

Next follows a description of a configuration of this embodiment with specific data. For the quarter waveplate 3 and the variable retardation plate 4, assume that λ is a wavelength of 550 nm having a high photopic luminous efficiency function. The variable retardation plate 4 provides four retardations Δ(0, λ/4, λ/2, and 3λ/4) (nm). Table 1 indicates a transmittance to linearly polarized light having a different vibration direction corresponding to each retardation of the variable retardation plate 4 or the transmittance $[T_{ij}]$ in the expression (1). In Table 1, φi represents an angle between the vibration direction of the incident polarized light and the x-axis direction, and a numerical value is a value close to the center of the image display element and obtained as a value made by averaging the polarization characteristics of the incident light fluxes with an incident angle of 15 degrees. The maximum transmission angle $\varphi_o$ of each retardation Δ is shown at the lowest column in Table 1. For example, the polarization state that has transmitted through the variable retardation plate 4 with a retardation Δ of λ/4 is a state illustrated in FIGS. 5A to 5D. The angle φi of 45 degrees provides the highest transmittance and the orthogonal angle φi of 135 degrees provides the lowest transmittance. A relationship between the maximum transmission angle $\varphi_o$ and the retardation ψ(degree) at a wavelength 550 nm can be expressed as $\varphi_o = -\psi/2 + 90$. For other wavelengths, the maximum transmission angle $\varphi_o$ changes according to a wavelength dispersion of the variable retardation plate 4. When a dispersion characteristic of the variable retardation plate 4 is known, the maximum transmission angle $\varphi_o$ can be calculated for an arbitrary wavelength.

Referring now to FIG. 4, a description will be given of a method for estimating an azimuth dependency of an intensity in incident polarized light. Based on FIG. 4B, polarized light intensity for each azimuth φ is as follows: I(0)=0.75, I(45)=1.0, I(90)=0.75, and I(135)=0.5. $[T_j]$ is as follows in accordance with expression (1) where $[I(\varphi_i)]$ represents four intensities in the incident polarized light and multiplied by the transmittance $[T_{ij}]$ in Table 1: T(j=0,Δ=0)=1.500, T(j=1, Δ=λ/4)=1.746, T(j=2,Δ=λ/2)=1.500, and T(j=3, Δ=3λ/4)=1.250. When they are normalized by the maximum value, T'(j=0)=0.859, T'(j=1)=1.000, T'(j=2)=0.861, and T'(j=3)=0.716 are obtained.

Figure 8A:
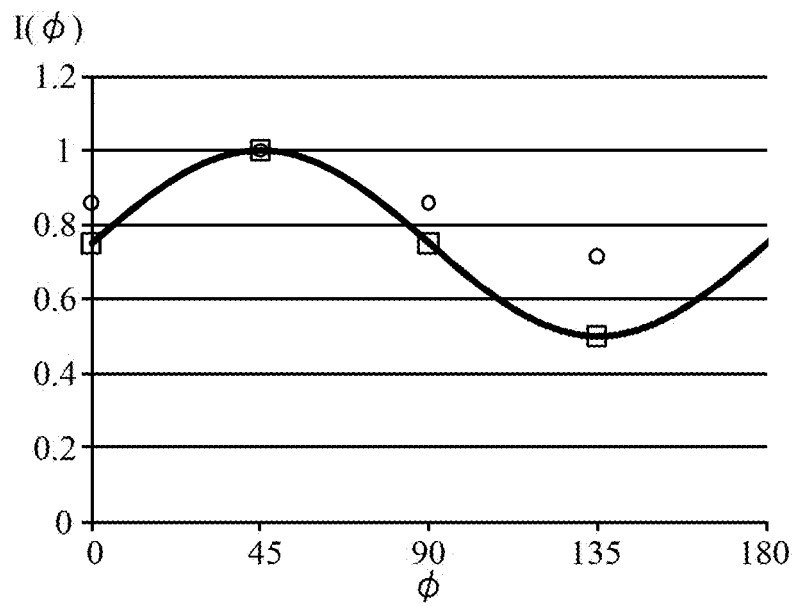
FIGS. 8A and 8B illustrate light intensity dependencies of polarization components of the polarization obtainer.
Figure 8B:
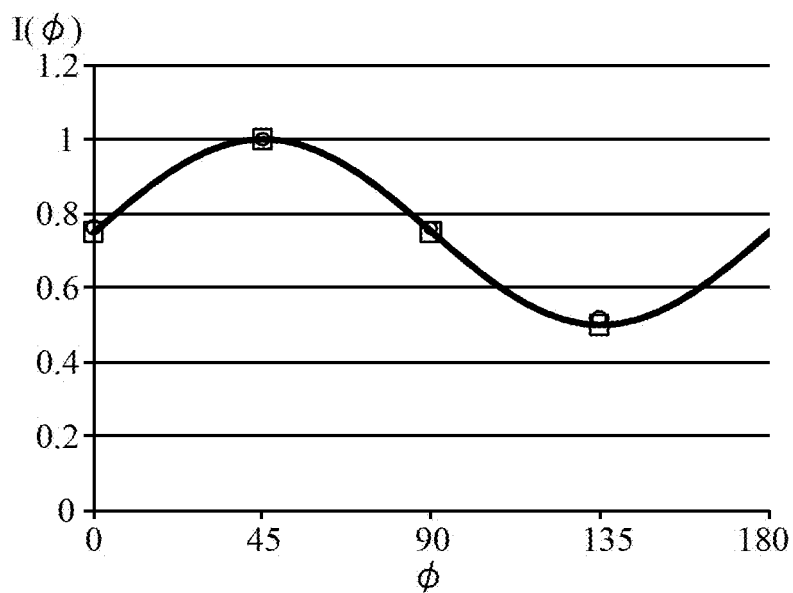

The maximum transmission angles $\varphi_o$ are 90 degrees, 45 degrees, 0 degrees, and 135 degrees for j=0, 1, 2, and 3, and FIG. 8A illustrates a graph that plots transmission light intensities T'($\varphi_o$) after j is converted into $\varphi_o$, and T' is normalized and superimposed on the light intensity I(φ). A square plot in FIG. 8A represents a light intensity obtained by setting the transmitting axis direction of the polarizer 5 to the maximum transmission angle $\varphi_o$, and a circle plot represents a light intensity obtained by the polarization obtainer 7. It is found based on each data that an azimuth angle of a polarization component that maximizes the light intensity is 45 degrees by fitting of A, B, and φ in I(φ)=A+B*Sin²(φ−φ₀) as the least square method etc. However, the circular plot contains an offset value larger than that of the light intensity. This offset is caused by a drop of an extinction ratio in the polarization information acquiring process. For example, when the minimum value of the normalized transmittance T' is subtracted from T(φ) and again normalized, the offset can be simply cancelled to some extent. FIG. 8B illustrates a post-process graph similar to FIG. 8A. Each plot in FIG. 8B is pursuant to FIG. 8A. The data in FIG. 8B more precisely reflects the plots of the incident intensity than that in FIG. 8A.

TABLE 1

|  | Δ = 0 | Δ = λ/4 | Δ = λ/2 | Δ = 3λ/4 |
|---|---|---|---|---|
| Φi = 0 | 0.0000 | 0.4971 | 1.0000 | 0.5086 |
| Φi = 45 | 0.5000 | 1.0000 | 0.5057 | 0.0001 |
| Φi = 90 | 1.0000 | 0.4971 | 0.0000 | 0.4914 |
| Φi = 135 | 0.5000 | 0.0000 | 0.4943 | 1.0000 |
| Maximum Transmission Azimuth | Φ = 90 | Φ = 45 | Φ = 0 | Φ = 135 |

This embodiment sets four values from 0 to 3λ/4 every λ/4 to the retardation of the variable retardation plate 4, but may set a single value, two values or three values in accordance with the obtained polarization information. For example, once the polarization information is obtained while the image pickup apparatus is fixed or where azimuths of the maximum intensity and the minimum intensity of the polarization dependency are known to some extent, only the state may be imaged. Thus, the single value may provide an image having necessary polarization information. For analytical convenience, an image may be captured while an integer multiple of λ/4 is set to the retardation of the variable retardation plate 4.

An image obtained by the image pickup apparatus 100 may be directly output without receiving calculation processing, such as image processing. The retardation of the variable retardation plate 4 may be set, for example, by previously obtaining the polarization component of the light from the object to be introduced to the image pickup element 2 in focusing, and by obtaining the proper polarization state. Even when the polarization state of the object is not previously obtained, the retardation of the variable retardation plate 4 may be set so as to continuously obtain specific (one or more) polarization states in advance.

The calculation processing between images having different polarization information can provide an image in which the feature of the object is highlighted for a pixel unit. For example, an image in which a scattering light component of the object is highlighted or an image in which a regular reflection component from the object is highlighted can be obtained by generating an image only with the lowest or highest light intensity value in the obtained data. The light intensity value in the polarized light may be a direct value of the image obtained by the polarization obtainer 7 or an interpolation or extrapolation value from the polarization analysis. The interpolation or extrapolation means use of an estimated value from the analytical result so as to highlight or restrain the obtained polarization intensity difference.

Thus, an image in which the feature amount is highlighted or restrained is obtained by optically obtaining the object information. The combination can generate an image suitable for the intent of the photographer. The image may be generated which has different polarization information or a different highlight effect for each image area. For example, when images having different polarization states are combined for a main object and a background, such as a sky, the background color can be made uniform or an image in which each of the background and the main object is highlighted can be generated. An image suitable for the purpose can also be acquired through various processing by utilizing the polarization intensity dependency of the object.

Second Embodiment

In the image pickup apparatus 100 according to this embodiment, as illustrated in FIGS. 9A and 9B, the quarter waveplate 3 and the variable retardation plate 4 are adjacently arranged on the light incident side of the optical system 1, and the quarter waveplate 19 and the polarizer 5 are adjacently arranged between the optical system 1 and the image pickup element 2. The quarter waveplate 19 is disposed on the light incident side of the polarizer 5. A description will be omitted of a configuration common to that of the first embodiment.

The polarizer 5 in the first embodiment cuts the reflected light from the image pickup element 2 from reaching the optical system 1, whereas the polarizer 5 in this embodiment absorbs stray light reflected by the optical system 1 towards the image pickup element 2, as illustrated in FIG. 9A.

This embodiment disposes the quarter waveplate 19 on the light incident side of the polarizer 5 so that the slow axis direction or the fast axis direction tilts to the transmitting axis direction of the polarizer 5 by 45 degrees. However, the angle may not be strictly 45 degrees and may be substantially (approximately) 45 degrees so as to permit a slight angular shift by several degrees. This embodiment arranges the variable retardation plate 4 and the quarter waveplate 19 so that their fast axes or slow axes form an angle of 45 degrees. However, the angle may not be strictly 45 degrees and may be substantially (approximately) 45 degrees so as to permit a slight angular shift by several degrees. This arrangement enables the polarization information to be efficiently obtained and the stray light to be efficiently reduced.

This embodiment enables polarization information to be obtained even when the polarizer 5 has any transmitting axis directions, as long as the slow axis directions or fast axis directions of the quarter waveplates 3 and 19 are parallel or perpendicular to each other and form 45 degrees relative to the slow axis direction or the fast axis direction of the variable retardation plate 4.

The quarter waveplate 3 and the variable retardation plate 4 may be arranged as a filter on a front surface of the optical system 1, and the quarter waveplate 19 and the polarizer 5 may be arranged as an attachment between the optical system 1 and the image pickup apparatus 100 that includes the image pickup element 2. At least an axial azimuth of the quarter waveplate 19 may be manually adjusted so as to adjust the axial azimuth of the variable retardation plate 4 and the axial azimuths of the quarter waveplate 19 and the polarizer 5.

The stray light generated from the optical system 1 can be reduced by rotating the quarter waveplate 19 and the polarizer 5 around the optical axis. The maintained relationship between the axial azimuths of the quarter waveplate 3 and the variable retardation plate 4 enables the polarization information to be obtained and the stray light reflected on the image pickup element 2 to be restrained.

One variation of this embodiment may arrange, as illustrated in FIG. 9B, the quarter waveplate 3, the variable retardation plate 4, quarter waveplate 19, and the polarizer 5 in this order between the optical system 1 and the image pickup element 2. This variation cannot completely remove the influence of a varied retardation of the variable retardation plate 4, but can provide the effect of the present invention.

Third Embodiment

This embodiment discusses an image pickup apparatus 200 based on the influence that occurs where an optical low-pass filter etc. is disposed. A description of a configuration common to that of the first embodiment will be omitted.

In general, an optical low-pass filter is disposed near the image pickup element so as to prevent the moiré and false color in an image pickup apparatus, such as a digital single-lens reflex camera. The polarization information of the object may not be correctly acquired even with the configuration of the first embodiment, if the optical low-pass filter is disposed in front of the image pickup element 2 or the autofocus unit depends on the polarization. In addition, when the polarization obtainer 7 is simply disposed between the optical low-pass filter and the lens, the optical low-pass filter may not maintain the intended effect due to the influence of the polarization obtainer 7.

FIG. 10 is a schematic diagram of the image pickup apparatus 200 including an optical low-pass filter 17. The optical low-pass filter 17 can use a component using a polarization characteristic, such as a component in which a plurality of layers made of a birefringent medium are laminated and a polarization diffraction element.

As a solution for the above problem that occurs when the optical low-pass filter etc. is disposed, this embodiment inserts an achromatic quarter waveplate 16 (achromatic retardation plate, fourth retardation plate) into a space between the polarizer 5 and the optical low-pass filter 17 so as to convert the light into circularly polarized light. Although a usual quarter waveplate may be inserted, the quarter waveplate has a wavelength dispersion and does not provide uniformly circularly polarized light over the visible wavelength range. Thus, a phase shift caused by the wavelength may appear as a color change in the image. Accordingly, a quarter wavelength plate to be inserted may be an achromatic quarter wavelength plate in which a retardation is designed to be minimum in the working wavelength range, such as a visible wavelength range.

In addition to the above effect, this embodiment inserts the achromatic quarter waveplate 16 and the polarizer 5 can cut the stray light reflected on the image pickup element 2. Hence, this embodiment can precisely obtain the polarization information of the object.

An alternative measure is to arrange a light separation direction of a layer in the optical low-pass filter 17 closest to the polarization obtainer 7 (in case of a laminated structure) and a transmitting axis direction of the polarizer 5 at 45 degrees. Even in this case, the characteristic of the optical low-pass filter and the characteristic of the polarization obtainer 7 can be maintained and the stray light can be restrained. The latter measure is simpler although any one of the countermeasures can be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-137000, filed Jul. 11, 2016 which is hereby incorporated by reference herein in its entirety.

What is claimed is:

1. An optical apparatus configured to introduce light from an object to an image pickup element, the optical apparatus comprising:
    a first retardation plate configured to provide a retardation of $\pi/2$ between a polarization component in a slow axis direction and a polarization component in a fast axis direction;
    a second retardation plate configured to change a retardation to be provided between a polarization component in a slow axis direction and a polarization component in a fast axis direction;
    a third retardation plate configured to provide a retardation of $\pi/2$ between a polarization component in a slow axis direction and a polarization component in a fast axis direction;
    a polarizer configured to extract a polarization component to be introduced to the image pickup element; and
    a setter configured to set the retardation of the second retardation plate,
    wherein the first retardation plate, the second retardation plate, and the polarizer are arranged in this order from a side of the object to a side of the image pickup element,
    wherein the slow axis direction or the fast axis direction of the second retardation plate tilts to the slow axis direction or the fast axis direction of the first retardation plate, and
    wherein the setter sets the retardation of the second retardation plate according to the polarization component of the light from the object.

2. The optical apparatus according to claim 1, wherein the third retardation plate is disposed between the second retardation plate and the polarizer.

3. The optical apparatus according to claim 2, wherein the slow axis direction or the fast axis direction of the first retardation plate and that of the third retardation plate are parallel or orthogonal to each other.

4. The optical apparatus according to claim 1, wherein the slow axis direction or the fast axis direction of the second retardation plate tilts to that of the first retardation plate by 45 degrees.

5. The optical apparatus according to claim 1, wherein the third retardation plate is disposed between the polarizer and the image pickup element.

6. The optical apparatus according to claim 4, wherein the slow axis direction or the fast axis direction of the first retardation plate is parallel to a polarization direction extracted by the polarizer.

7. The optical apparatus according to claim 1, wherein the slow axis direction or the fast axis direction of the third retardation plate tilts to a polarization direction extracted by the polarizer by 45 degrees.

8. The optical apparatus according to claim 1, wherein the setter sets the retardation of the second retardation plate so that a polarization component in the light from the object to be introduced to the image pickup element passes the second retardation plate, and then have a polarization direction parallel to that extracted by the polarizer.

9. The optical apparatus according to claim 1, wherein the second retardation plate includes a single retardation plate, and
    wherein the first retardation plate, the second retardation plate, the third retardation plate, and the polarizer are adjacently arranged.

10. The optical apparatus according to claim 1, wherein the second retardation plate includes a retardation plate using liquid crystal, and
    wherein the setter sets a voltage applied to the second retardation plate.

11. The optical apparatus according to claim 1, wherein the setter sets an integer multiple of $\lambda/4$ to the retardation of the second retardation plate.

12. The optical apparatus according to claim 1, further comprising an optical low-pass filter that includes a plurality of layers and is disposed between the image pickup element and the polarizer,
    wherein a light separation direction on one of the layers closest to the polarizer in the optical low-pass filter tilts to a polarization direction extracted by the polarizer by 45 degrees.

13. The optical apparatus according to claim 12, wherein the optical low-pass filter utilizes birefringence or a polarization diffraction element.

14. The optical apparatus according to claim 1, further comprising:
    an optical low-pass filter disposed between the image pickup element and the polarizer; and
    a fourth retardation plate disposed between the optical low-pass filter and the polarizer, and configured to provide a retardation of $\pi/2$ between a polarization component of a slow axis direction and a polarization component of a fast axis direction, wherein the slow axis direction or the fast axis direction of the fourth retardation plate tilts to a polarization direction extracted by the polarizer by 45 degrees.

15. The optical apparatus according to claim 14, wherein at least one of the first retardation plate and the fourth retardation plate is an aromatic retardation plate.

16. The optical apparatus according to claim 1, wherein the polarizer absorbs 50% or more of the polarization component in a direction orthogonal to the polarization direction extracted by the polarizer, in a visible wavelength band.

17. An image pickup apparatus comprising:
an image pickup element configured to receive light from an object;
a first retardation plate configured to provide a retardation of $\pi/2$ between a polarization component in a slow axis direction and a polarization component in a fast axis direction;
a second retardation plate configured to change a retardation to be provided between a polarization component in a slow axis direction and a polarization component in a fast axis direction;
a third retardation plate configured to provide a retardation of $\pi/2$ between a polarization component in a slow axis direction and a polarization component in a fast axis direction;
a polarizer configured to extract a polarization component to be introduced to the image pickup element; and
a setter configured to set the retardation of the second retardation plate,
wherein the first retardation plate, the second retardation plate, and the polarizer are arranged in this order from a side of the object to a side of the image pickup element,
wherein the slow axis direction or the fast axis direction of the second retardation plate tilts to the slow axis direction or the fast axis direction of the first retardation plate, and
wherein the setter sets the retardation of the second retardation plate according to the polarization component of the light from the object.

18. The image pickup apparatus according to claim 17, further comprising a controller configured to control the setter and the image pickup apparatus,
wherein the controller obtains an image from the image pickup element for each retardation of the second retardation plate, and obtains the polarization information of the object based on an obtained image.

19. The image pickup apparatus according to claim 17, further comprising an optical system closer to the object than the first retardation plate.

20. The image pickup apparatus according to claim 17, wherein the third retardation plate is disposed between the second retardation plate and the polarizer.

* * * * *